United States Patent Office 3,040,070
Patented June 19, 1962

3,040,070
PROCESS FOR THE PREPARATION OF 17α-HYDROXY-16α-METHYL-20-KETO STEROIDS OF THE 5α-SERIES
Gordon Hanley Phillipps and William Graham, Greenford, Gordon Ian Gregory, Chalfont St. Peter, and Joseph Elks, Golders Green, London, England, assignors to Glaxo Laboratories Limited, Greenford, England, a British company
No Drawing. Filed July 18, 1960, Ser. No. 43,290
Claims priority, application Great Britain July 20, 1959
3 Claims. (Cl. 260—397.45)

This invention is concerned with improvements in or relating to the preparation of steroid compounds, and, more particularly, with the preparation of 16α-methyl steroid compounds possessing anti-inflammatory and/or adrenocortical activity, analogues thereof and intermediates therefor.

Various steroids having a methyl group in the α- or β-configuration in the 16-position have been described as having important pharmacological properties and, in general, are said to possess more pronounced anti-inflammatory properties and less undesirable side effects than the corresponding steroids not possessing the 16-methyl group. The preparation of such compounds has hence become of importance.

The preparation of 16-methyl steroids from 11-keto steroids of the 5β-pregnane series has been described. However, some substances readily available and hitherto used as starting materials for the manufacture of adrenocortical hormones are members of the 5α-series, an important example of such a substance being hecogenin.

It is thus a general object of the present invention to provide a convenient process for the production of steroids of the 5α-series, characterised by possessing a 17α-hydroxy-16α-methyl-20-keto structure, from corresponding steriods of the 5α-series possessing a 16-methyl-16-en-20-keto structure. The production of corresponding compounds in which the methyl group at position 16 has the β-configuration is the subject of copending application No. 43,286 of even date herewith.

Steroid compounds of the 5α-pregnane series possessing a 16-methyl-16-en-20-keto structure can be prepared from raw materials such as hecogenin in various known ways dependent on the nature of the remaining portions of the molecule. Thus, for example, hecogenin acetate can be converted in several steps to form 3β-acyloxy-5α-pregna-9(11):16-dien-20-ones (cf. Djerassi et al., J. Org. Chem. 1951, 16, 1278, and Callow and James J.C.S. 1956, 4739) which can be converted to 3β-acyloxy-16-methyl-5α-pregna-9(11):16-dien-20-ones, for example by the methods described in application No. 43,095, filed July 15, 1960. These last-mentioned intermediates are analogous to intermediates hitherto used in the synthesis of anti-inflammatory compounds. Other similar intermediates in the 5α-pregnane series containing 16-methyl-20-keto structures are the corresponding 9:11-dichloro compounds and the corresponding compounds containing a saturated Ring C and an oxygen function at position 11. It is hence a specific object of the present invention to provide a means of introducing 17α-hydroxy groups in intermediates of the kind just mentioned of the 5α-pregnane series.

In principle, the process of the present invention involves rearrangement of a 16:17-epoxy-16β-methyl-20-keto steriod (which can readily be obtained by epoxidation of a Δ¹⁶-steroid) followed by hydrogenation of the product to a 17α-hydroxy-16α-methyl-20-keto compound.

The 17α-hydroxy-16α-methyl-20-keto products according to the invention can be converted into compounds having anti-inflammatory and/or adrenocortical activity in various ways and procedures for such conversions are now well-known. Thus, for example, from the products according to the invention, one can prepare the 16α-methyl analogues of cortisone, hydrocortisone, prednisone, prednisolone, the 9-halogen derivatives of such compounds, 9:11-dichloro-11-desoxypredisolone and so on. As will be seen, the preparation of such compounds from the products according to the invention may require the formation of a 3-keto group, introduction of unsaturation in Ring A, the introduction of the desired substituent(s) in Ring C and the introduction of a hydroxy (or acyloxy) group at position 21, all of which steps can in principle be carried out by procedures hitherto used in the production of anti-inflammatory and/or adrenocortical hormones. For example, a compound of particular interest is 16α-methyl-9α-fluoro-prednisolone acetate which can be prepared from a 3β-acyloxy-17α-hydroxy-16α-methyl-5α-pregn-9(11)-en-20-one by hydrolysis of the 3-acyloxy group, bromination followed by acetoxylation at the 21-position, formation of the 3-keto group, dibromination and dehydrobrominating in Ring A to give a Δ¹,⁴ structure, epoxidising the 9(11)-double bond and then reacting the 9,11-epoxy grouping with hydrogen fluoride to form 16α-methyl-9α-fluoro-prednisolone acetate. If desired in any or all of the reactions of this sequence up to and including acetoxylation at position 21, the double bond at the 9(11)-position can be protected by dichlorination, the chlorine atoms being subsequently removed, e.g. by hydrogenation.

We have found, according to the invention, that rearrangement of 16:17-epoxy-16β-methyl-20-keto steroids of the 5α-series by means of an acid catalyst gives rise to either a 16-methylene compound or a 16-methyl Δ¹⁵-compound (or mixtures thereof) according to the conditions of rearrangement and that hydrogenation of either of such compounds in the presence of certain catalysts gives rise to products containing a substantial proportion of 16α-methyl compounds. As an important feature of the invention we found further that, for the production of products containing comparatively high proportions of 16α-methyl compounds as against 16β-methyl compounds, it is desirable to carry out the rearrangement of the epoxide under such conditions (hereinafter described) that a product is obtained consisting of as high a proportion of Δ¹⁵-compound as possible. In other words hydrogenation under the conditions hereinafter set forth of the product of rearrangement of the epoxide gives one a product which whilst consisting essentially of a 16α-methyl compound may contain some 16β-methyl compound; the proportion of the 16β-methyl compound in the product can however in general be kept low by so conducting the rearrangement that the product thereof is a Δ¹⁵-compound.

According to the invention, therefore, there is provided a process for the preparation of 17α-hydroxy-16α-methyl-20-keto steroid of the 5α-series in which a 16:17-epoxy-16β-methyl-20-keto steroid of the 5α series is subjected to rearrangement in a solvent medium in the presence of an acid catalyst to form a product comprising a 16-methylene or a Δ¹⁵-steroid or a mixture thereof which product is then hydrogenated in the presence of a palladium hydrogenation catalyst to yield a product containing a 17α-hydroxy-16α-methyl-20-keto steroid.

According to a further feature of the invention the 16:17-epoxy compound is subjected to rearrangement in an ionising solvent medium, preferably a medium comprising a hydroxylic solvent such as a lower alcohol or an aqueous solvent medium.

In the process of the invention, therefore, to obtain essentially 16α-methyl compounds as distinct from 16β-methyl compounds it thus is firstly essential that the hydrogenation step be conducted in the presence of a palladium hydrogenation catalyst, other catalysts leading essentially to 16β-methyl compounds, and secondly it is preferable to conduct the rearrangement so that the product thereof is substantially a $\Delta^{15}$-compound.

The process of the invention can be illustrated diagrammatically as follows, ring D only of the molecule being illustrated:

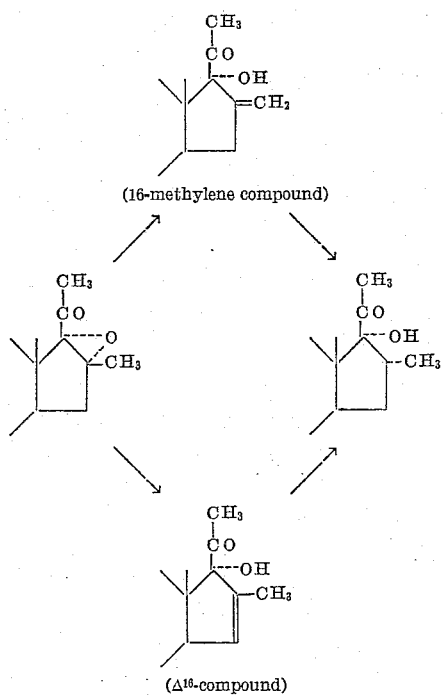

The process of the invention will now be described in greater detail:

1. PREPARATION OF 16:17-EPOXY-16β-METHYL-20-KETO COMPOUNDS OF THE 5α-SERIES FROM THE CORRESPONDING $\Delta^{16}$-COMPOUNDS This reaction is similar to the process described in British specification No. 805,497 and involves epoxidation with hydrogen peroxide under alkaline conditions, e.g. in the presence of sodium hydroxide. This reaction is in general selective to double bonds conjugated with a keto group and hence will not in general cause epoxidation of non-conjugated double bonds present elsewhere in the molecule, e.g. at the 9(11)-position.

Representative compounds obtained in this step and useful as starting material for the rearrangement stage, are for example compounds of the general formula

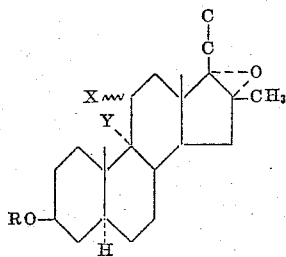

(where R=hydrogen or an acyl group, X is a keto, acyloxy, hydroxy or halogen group, Y is hydrogen or halogen or X and Y together signify a carbon-carbon bond (giving a $\Delta^{9(11)}$ compound)).

It should be noted that where a compound of this formula is required in which X and Y are both halogen, it is preferable first to epoxidise the corresponding $\Delta^{9(11)}$ compound and subject the resultant $\Delta^{9(11)}$–16:17–epoxide to halogenation, since 9:11-dihalo compounds tend to be unstable to the conditions used to epoxidise the $\Delta^{16}$-double bond.

For similar reasons, compounds in which X is an acyloxy group or a hydroxy group and Y is halogen are also best obtained by epoxidation of a $\Delta^{9(11)}$, 16-diene compound followed by addition of the elements of AcOHal or HOHal across the double bond, e.g. by the methods described by Robinson et al., J.A.C.S., 1959, 81, 2195 and Fried et al., J.A.C.S., 1957, 79, 1130.

2. REARRANGEMENT OF THE 16:17-EPOXY COMPOUND

In principle, this rearrangement involves treatment of the 16:17-epoxide in a solvent medium with an acid catalyst, which is preferably a strong or moderately strong acid. Suitable acids are, for example, hydrogen bromide, hydrogen chloride, sulphuric acid, perchloric acid or formic acid. Mineral acids are generally to be preferred.

We find that where the rearrangement is carried out in the presence of a solvent medium of low ionising power a product is obtained on rearrangement which tends to have a relatively high proportion of 16-methylene compound. By the term solvent medium of low ionising power, we mean such media wherein the acid catalyst is not freely ionised. Preferred solvents for this purpose are the ethers, e.g. diethyl ether, di-isopropyl ether, especially the cyclic ethers, such as dioxan, tetrahydrofuran, etc. Where the rearrangement is carried out in other media of stronger ionising power, e.g. acetic acid, products containing lesser proportions of 16-methylene compound are in general obtained.

Where the medium is one of comparatively strong ionising power i.e. one in which the acid used can freely ionise, the product of the rearrangement is in general substantially the $\Delta^{15}$-compound, which is preferred for the purpose of the present invention. Such media include media consisting of or containing hydroxylic solvents e.g. methanol or ethanol. The latter solvents may be admixed with other solvents not substantially reducing the ionising power of the medium but serving to improve the solubility of the steroid therein, examples of such other solvents being methylene dichloride, chloroform, dioxan, tetrahydrofuran etc. Media of high ionising power also include aqueous water-miscible solvents for the steroid, e.g. dioxan, tetrahydrofuran and acetic acid, the rearrangement in such cases being conveniently effected by dissolving the steroid epoxide in the water-miscible solvent and adding aqueous acid to bring about the reaction.

In general, hydrogen bromide is the preferred acid for effecting the rearrangement as it appears to provide the most consistent results of acids so far examined. The reaction is conveniently carried out at temperatures of between 15–30° C. The course of the reaction is best followed by observation of the change in specific rotation of the reaction mixture since the rotation of the desired product is in general, lower than that of the starting epoxide or any side products.

If the product of the rearrangement is a mixture of $\Delta^{15}$- and 16-methylene compound this can be separated e.g. by fractional crystallisation. However the $\Delta^{15}$- compound can if desired be readily freed from 16-methylene compound by taking advantage of the fact that the latter is more readily D-homo-annulated than the $\Delta^{15}$-compound, the $\Delta^{15}$-compound thus being easily separated from the resultant mixture. Thus, for example, treatment of the mixture of 16-methylene compound and $\Delta^{15}$-compound with boron trifluoride in a solvent, e.g. dioxan, tetrahydrofuran etc. under mild conditions effects substantially only D-homo-annulation of the 16-methylene compound.

16-methylene compounds can be conveniently distinguished from $\Delta^{15}$-compounds by comparison of infra-red spectra. In particular the 16-methylene compounds possess a marked band at about 910 cm.$^{-1}$.

3. HYDROGENATION OF THE PRODUCT OF THE REARRANGEMENT STAGE 2 TO A 16-METHYL COMPOUND

The hydrogenation is carried out using a palladium catalyst.

Where the hydrogenation is effected upon compounds also possessing a double bond in the 9(11)-position, it is generally best to carry out the reaction under neutral or basic conditions, conveniently in the presence of an organic base e.g. pyridine, N-methyl-morpholine and collidine, relatively strong bases such as triethylamine or triethanolamine being preferred. Supported palladium catalysts, e.g. using charcoal, calcium carbonate or kieselguhr as supports are convenient or alternatively palladium metal can be used. Acidic conditions may also be used but with increasing tendency to formation of undesired byproducts.

The hydrogenation is conveniently conducted in an inert solvent medium, suitable solvents being for example tetrahydrofuran, dioxan, ethanol, ethyl acetate, tertiary butanol, methanol, and the like or mixtures of one or more of these solvents. The reaction is further conveniently effected at atmospheric temperature and pressure.

The hydrogenation reaction may, of course, result in some change in other parts of the molecule. Thus for example, hydrogenation of 9:11-dichloro compounds with palladium catalysts in general gives rise to removal of the chlorine atoms with formation of a double bond. 9:11 double bonds are, however, fairly resistant to hydrogenation and, under the preferred condition of hydrogenation, given herein, are in general unaffected.

Where the hydrogenation product contains some 16β-methyl compound, separation may be effected as desired, e.g. by repeated crystallisation. It is sometimes found that slight modification of the molecule may facilitate this separation.

Thus, for example, 3β,17α-dihydroxy-16α-methyl-5α-pregn-9(11)-en-20-one when contaminated by the 16β-epimer, can be purified (a) by crystallisation of the 3β, 17α-diol (rather than the 3-acetate) or (b) by the controlled treatment of the mixed 3-acetates with boron trifluoride etherate in dioxan, which destroys the 16β-methyl isomer faster than the 16α-isomer.

16α-compounds may be distinguished from 16β-compounds in various ways, for example by difference in specific rotation, infra-red spectra and paper chromatography. Thus in general the specific rotation of a 16β-compound is more positive than that of the corresponding 16α-epimer; in paper chromatography a 16α-compound generally moves faster than the corresponding 16β-epimer.

In order that the invention may be well understood, the following examples are given by way of illustration only:

Example 1

(A) PREPARATION OF 3β-ACETOXY-16β-METHYL-16α:17α-EPOXY-5α-PREGN-9(11)-EN-20-ONE

3β-acetoxy - 16 - methyl-5α-pregna-9(11):16-dien-20-one (70 g.) was dissolved in a mixture of methanol (2.8 litres) and methylene chloride (350 ml.). 100 vol. hydrogen peroxide (210 ml.) was added, followed by water (450 ml.) and 5 N aqueous sodium hydroxide solution (140 ml.) and the mixture was stirred overnight at room temperature. A solid had precipitated by the end of the reaction period and the suspension was poured into water (5.0 litres) and extracted with methylene chloride (4×750 ml.). The extracts were bulked, washed with water (4×1.0 l.) and the solvent distilled off. The white solid residue was dissolved in pyridine (70 ml.) and acetic anhydride (70 ml.) and heated for 0.5 hour, on the steam-bath. Water (250 ml.) was added and the product filtered off, washed with water (4×100 ml.) and dried at 100° in vacuo for 4 hours to yield 3β-acetoxy-16β-methyl-16α:17α-epoxy-5α-pregn-9(11)-en-20-one (70 g.), M.P. 165–167°. The epoxide was recrystallised from methanol (1,700 ml.) filtered off, washed with a little methanol and dried at 100°, in vacuo.

Wt.=61 g. (83% yield), M.P. 169–172° and $$[\alpha]_D = +65.5° \text{ (c, 1 in CHCl}_3\text{)}.$$

(B) REARRANGEMENT OF 3β-ACETOXY-16β-METHYL-16α:17α-EPOXY-5α-PREGN-9(11)-EN-20-ONE

3β-acetoxy - 16β - methyl - 16α:17α - epoxy-5α-pregn-9(11)-en-20-one (5 g.) in acetic acid (110 ml.) was treated, with stirring, at room temperature, with 3.1% w/v hydrogen bromide in acetic acid (3.55 ml.). The mixture was stirred for 10 min. until the yellow colour developed and then anhydrous potassium acetate (0.15 g.) was added to discharge the colour and stop the reaction. The precipitated solid was filtered off, washed with water and dried in vacuo at 100°.

Wt.=1.8 g. (36%), M.P. 180–182°, $[\alpha]_D$ —69° (c, 1 in CHCl$_3$). The filtrate was concentrated under reduced pressure until solid began to precipitate. The mixture was allowed to stand at room temperature for 2 hours, isolated by filtration, washed with dilute acetic acid, water and then dried at 100° in vacuo.

Wt.=1.9 g. (38%), M.P. 178–181°, $[\alpha]_D$ —68.5° (c, 1 in CHCl$_3$).

The filtrate was diluted with water (200 ml.), extracted with methylene chloride (4×25 ml.) and the organic layers bulked, washed with water (1×50 ml.), saturated sodium bicarbonate solution (1×50 ml.) and water (1×50 ml.). The solvent was evaporated at reduced pressure and the residue recrystallised from petroleum ether (B.P. 100–120°).

Wt.=0.36 g., M.P. (166) 175–180°, $[\alpha]_D$ —60° (c, 1 in CHCl$_3$). The product comprised about 40% of 16-methylene compound and about 60% of 16-methyl Δ$^{15}$ compound.

Example 2

3β-acetoxy-16β-methyl-16α:17α-epoxy-5α-pregn-9(11)-en-20-one (1.0 g.) was treated as in Example 1(B) but with 56% aqueous hydriodic acid (0.04 ml.) instead of hydrobromic acid. The same product (0.56 g.) M.P. 180–182°, $[\alpha]_D =$ —68° (c, 1 in CHCl$_3$) was isolated.

Example 3

3β-acetoxy-16β-methyl-16α:17α-epoxy-5α-pregn-9(11)-en-20-one was treated with 4.02% w/v hydrochloric acid in acetic acid as above in Example 1(B) and this gave the same product (0.61 g.) M.P. 178–180°, $[\alpha]_D$ —69° (c, 1 in CHCl$_3$).

Example 4

3β-acetoxy-16β-methyl-16α:17α-epoxy-5α-pregn-9(11)-en-20-one (0.94 g.) in methylene chloride (10 ml.) was treated with 50% aqueous hydrobromic acid (10 ml.) at room temperature for 1 hour and gave a product (0.55 g.), M.P. 178–182°, $[\alpha]_D$ —70° (c, 1 in CHCl$_3$) believed to contain about 40% of 16-methylene compound and about 60 of 16-methyl-Δ$^{15}$ compound.

Example 5

3β-acetoxy-16β-methyl-16α:17α-epoxy-5α-pregn-9(11)-en-20-one (0.5 g.) in acetic acid (11 ml.) was treated with N sulphuric acid (1 ml.) and allowed to stand at room temperature for 1½ hours. The product (0.3 g.) was isolated on working up—M.P. 178–181°, $[\alpha]_D$ —67° (c, 1 in CHCl$_3$) and contained about 70% of 16-methyl-Δ$^{15}$ compound.

Example 6

3β-acetoxy-16β-methyl-16α:17α-epoxy-5α-pregn-9(11)-en-20-one (0.5 g.) was dissolved in acetic acid (20 ml.)

containing 2 drops of perchloric acid. The reaction was followed polarimetrically:

| Time (mins.): | $\alpha_D,°$ |
|---|---|
| 0 | +1.5 |
| 1 | +0.9 |
| 3 | +0.79 |
| 6 | +0.98 |
| 8 | +1.13 |
| 11 | +1.27 |
| 15 | +1.42 |
| 18 | +1.52 |
| 20 | +1.58 |
| 23 | +1.62 |

The reaction was stopped by the addition of anhydrous potassium acetate and worked up in the same manner to yield a product (0.15 g.) having M.P. 180–182° $[\alpha]_D$ −71° (c, 1 in CHCl$_3$).

Example 7

When 3β-acetoxy-16β-methyl-16α:17α-epoxy-5α-pregn-9(11)-en-20-one (0.5 g.) was shaken at room temperature for 4 hours in a two-phase system consisting of benzene (10 ml.), water (10 ml.) and formic acid (0.2 ml.), unchanged starting material was recovered. When a benzene (10 ml.) and formic acid (1.0 ml.) was used a mixture of starting material containing some of the rearrangement product was formed as indicated by the rotation ($[\alpha]_D$ = +50°). When, however, this mixture was boiled for 2.5 hours, complete rearrangement occurred as shown by the constants of the final product: M.P. 180–183°, $[\alpha]_D$ −76° (c, 1 in CHCl$_3$). The product contained about 70% of 16-methylene compound.

Example 8

PREPARATION OF 3β-ACETOXY-17α-HYDROXY-16α-METHYL-5α-PREGN-9(11)-EN-20-ONE

A catalyst consisting of 10% Pd/C (0.25 g.) was pre-reduced in tetrahydrofuran (2 ml.) (9.7 ml. hydrogen absorbed over 30 mins.) and the re-arrangement product of Example 1(B) (1.0 g.) was then added in tetrahydrofuran (7 ml.) and triethylamine (0.15 ml.). A further 1 ml. of tetrahydrofuran was used as washings and the hydrogenation commenced. The theoretical quantity of hydrogen (62.8 ml. at 22°) was absorbed in about 4 hours and the catalyst was then filtered off, washed with tetrahydrofuran (4×5 ml.) and the filtrate evaporated under reduced pressure to near dryness and water (50 ml.) added. The solid was filtered off, washed with water and dried at 100° in vacuo.

Wt.=0.95 g., M.P. 158–163°

The steroid (0.95 g.) was dissolved in methanol, hot filtered, evaporated to about 10 ml. and allowed to crystallise. This product (M.P. 162–166°) was recrystallised from petroleum ether (B.P. 100–120°) (15 ml.), allowed to stand overnight at room temperature, filtered off, washed with a little petroleum ether (B.P. 100–120°) and dried at 100° in vacuo.

Wt.=0.58 g., M.P. 165–170°, $[\alpha]_D$ −17.4° (c, 1 in CHCl$_3$).

Example 9

Example 10 was repeated but omitting the triethylamine and using steroid (0.5 g.), tetrahydrofuran (6.0 ml.) and pre-reduced 10% Pd/C catalyst (0.25 g.). Hydrogenation was complete in about 1 hour. The product was isolated by total precipitation from water.

Wt.=0.47 g., M.P. 169–174°, $[\alpha]_D$ −17.0° (c, 1 in CHCl$_3$). The product (0.4 g.) was recrystallised from cyclohexane (25 ml.) and dried in vacuo at 100°.

Wt.=0.25 g., M.P. 174–177°, $[\alpha]_D$ −18.6° (c, 1 in CHCl$_3$).

Example 10

The re-arrangement product of Example 1(B) (0.5 g.) in acetic acid (8 ml.) and methylene chloride (2 ml.) was added to a catalyst of 10% Pd/C (0.25 g.) which had been pre-reduced in acetic acid (2 ml.). The hydrogen uptake was complete after 1.5 hours and the product was worked up as in Example 10.

Wt.=0.47 g., M.P. 167–172° C., $[\alpha]_D$ = −15° (c, 1 in CHCl$_3$).

Example 11

3β-ACETOXY-17α-HYDROXY-16-METHYLENE-5α-PREGN-9(11)-EN-20-ONE

3β - acetoxy - 16α:17α - epoxy - 16β - methyl - 5α-pregn-9(11)-en-20-one (6.0 g.) in solution in pure dioxan (50 ml.) was treated at room temperature with a 2.2% (w/v) solution of hydrogen bromide in acetic acid (1.0 ml.). The specific rotation of the steroid fell from $[\alpha]_D$ +63° and became steady at $[\alpha]_D$ −36° in 12 minutes. Crystals began to separate after 13 minutes and after 15 minutes the suspension was diluted with water to 400 ml. The crystalline product (5.9 g.), M.P. 178–180°, $[\alpha]_D$ −80° (c, 1.4 in CHCl$_3$), was filtered off, washed with water and dried at 0.1 mm./100° C. for 3.5 hr. Crystallisation of the crude product (4.0 g.) from ethyl acetate (20 ml.) gave the 16-methylene-compound (2.89 g.) as needles, M.P. 181–182°, $[\alpha]_D$ −81° (c, 1.15 in CHCl$_3$). (Found: C, 74.8; H, 8.9. C$_{24}$H$_{34}$O$_4$ requires C, 74.7, H, 8.9%.) Other similar experiments were carried out as in the following table.

| Steroid Concentration, percent | AcOH percent conc. in dioxan | Percent HBr (w./v.) | Time, min. | Percent Yield | $[\alpha]_D$ CHCl$_3$ |
|---|---|---|---|---|---|
| 11.8 | 1.96 | 0.043 | 15 | 98.5 | −80° |
| 11.8 | 0.08 | 0.043 | 50 | 93.5 | −80° |
| 9.85 | 1.58 | 0.035 | 17 | 98.1 | −79° |
| 11.9 | 0 | 0.047 | 15 | 93.5 | −78° |
| 1.9 | 3.85 | 0.085 | 12 | 90.0 | −80° |
| 1.96 | 1.96 | 0.043 | 36 | 93.0 | −79.5° |

Example 12

3β-ACETOXY-17α-HYDROXY-16-METHYLENE-5α-PREGNANE-11,20-DIONE

3β - acetoxy - 16α:17α - epoxy - 16β - methyl - 5α-pregnane-11,20-dione (500 mg.) in pure dioxan (25 ml.) was treated at room temperature with a 2.2% solution of hydrogen bromide in acetic acid (1.0 ml.). The specific rotation of the steroid fell from +65° and became steady at +2° in 40–45 minutes. After 50 min. the solution was poured into water (170 ml.) and the precipitated product (450 mg.), $[\alpha]_D$ −25° (c, 1.4 in CHCl$_3$) was collected by filtration and washed with water, and dried. Crystallisation from acetone-hexane, gave the 16-methylene compound (174 mg.) $[\alpha]_D$ −42° (c, 1.28 in CHCl$_3$). Found: C, 71.1; H, 8.5; C$_{24}$H$_{34}$O$_5$ require C, 71.6; H, 8.5%.

Example 13

(A) 3β-ACETOXY-9α:11β-DICHLORO-16α:17α-EPOXY-16β-METHYL-5α-PREGNAN-20-ONE

3β - acetoxy - 16β - methyl - 16α:17α - epoxy - 5α-pregn-9(11)-en-20-one (2.8 g.) in chloroform (60 ml.) was treated with a solution of chlorine (0.44 g., 1 equiv.) in carbon tetrachloride (11.2 ml.). The yellow colour was discharged immediately. After standing for 10 min. the solution was washed successively with dilute aqueous sodium thiosulphate and water. The organic solution was dried (MgSO$_4$) and the solvent was removed to leave a pale yellow crystalline solid (3.28 g., 99%), M.P. 184–188°. Crystallisation from acetone gave 3β-acetoxy-9α:11β - dichloro - 16α:17α - epoxy - 16β - methyl - 5α-pregnan-20-one (3.02 g., 91%), M.P. 193–195° (Kof.), $[\alpha]_D$ +58° (c, 1.2 in CHCl$_3$). (Found: C, 63.06; H, 7.64; Cl, 15.65; C$_{24}$H$_{34}$O$_4$Cl$_2$ requires C, 62.96; H, 7.5; Cl, 15.5%.)

(B) PREPARATION OF 3β-ACETOXY-9α:11β-DICHLORO-17α-HYDROXY-16-METHYLENE-5α-PREGNAN-20-ONE (i) *In dioxan.*—3β-acetoxy-9α:11β-dichloro-16α:17α-epoxy-16β-methyl-5α-pregnan-20-one (500 mg.) in pure dioxan (25 ml.) was treated at room temperature with a 2.2% solution of hydrogen bromide in acetic acid (1.0 ml.). The specific rotation of the steroid fell from +53° and became steady at +0.5° in 35–40 min. After 46 min. the solution was poured into water, and the precipitated product (479 mg.), $[\alpha]_D$ −23.5° (c, 1.0 in $CHCl_3$) was collected by filtration, washed with water, and dried. Crystallisation from acetone-hexane gave the 16-methylene-compound (292 mg.), M.P. 189° (decomp.), $[\alpha]_D$ −29° (c, 1.48 in $CHCl_3$).

(ii) *In acetic acid.*—The epoxide (8.9 g.) was dissolved in a mixture of methylene chloride (40 ml.) and glacial acetic acid (340 ml.) and treated with a solution of hydrogen bromide in glacial acetic acid (8.9 ml. of a solution containing 2.2 g. HBr in 100 ml.). The mixture was kept at room temperature until the rotation had fallen to a constant value (ca. 15 min.); the colour of the solution was a greenish-blue. The mixture was poured into a large volume of 1% sodium acetate solution. The product was extracted with methylene chloride, the organic layer was washed successively with water, aqueous sodium bicarbonate and water, dried ($MgSO_4$) and the solvent removed to give a yellow solid. This product was crystallised from acetone-hexane and dried at 80–90° in vacuo furnishing 3β-acetoxy-9α:11β-dichloro-16-methylene-17α-hydroxy-5α-pregnan-20-one (7.4 g., 83%), M.P. 193–195° $[\alpha]_D$ −34° (c, 0.94 in $CHCl_3$). (Found: C, 63.1; H, 7.5; Cl, 15.2. $C_{24}H_{34}O_4Cl_2$ requires C, 63.0; H, 7.5; Cl, 15.5%.)

*Example 14*

(A) PREPARATION OF THE 16:17-PYRAZOLINE OF 3β-ACETOXY-5α-PREGN-16-ENE-11:20-DIONE (i) *Use of N:N′ - dinitroso-N:N′ - dimethylterephthalamide (N.N.P.).*—3β-acetoxy-5α-pregn-16-ene-11:20 dione (200 g.) was dissolved in methylene chloride (3.1) in a 10 l. three-neck flask fitted with thermometer, dropping funnel, nitrogen inlet and stainless steel stirrer. N.N.P. reagent (200 g.) was added with stirring and the total solution brought to 27°.

40% aqueous sodium hydroxide solution (1.75 l.) was run in over two hours initially maintaining the temperature at 27° then, when reaction set in, cooling to maintain the temperature below 30°. Ice water (4 l.) was added and the resulting two phase mixture stirred while a brisk nitrogen stream was bubbled through to remove excess diazomethane. When the colour of the solution indicated that diazomethane was absent, the two phases were separated and the aqueous phase extracted with methylene chloride (3×400 ml.), the bulked methylene chloride extract washed with water (3×500 ml.) and taken to dryness finally under reduced pressure. The white solid product was broken up under petroleum (B.P. 40–60°, 600 ml.), filtered and dried at 60°/0.1 mm. for 3 hours, yield 191 g., M.P. 176–176.5° dec., $[\alpha]_D$=+111° (c, 1 in $CHCl_3$).

(ii) *Using N-nitroso-N-methylurea.*—3β-acetoxy-5α-pregn-16-ene-11:20-dione (200 g.) was dissolved in methylene chloride (2 l.) and cooled to 5° in a 5 l. three-necked flask fitted with stirrer, thermometer, nitrogen inlet and dropping funnel. The solution was stirred and cooled to −5° while nitrosomethylurea (130 g. 10% moisture) was added.

Potassium hydroxide (45% solution, 200 ml.) was run in with stirring at such a rate as to keep the temperature between −5° and 0° (ca. 30–45 min.) then the reaction mixture was allowed to warm to 20° over 90 min. and ice water (1.5 l.) added. Nitrogen was bubbled through the reaction mixture until the diazo-methane colour was removed. The two layers were separated and worked up as under (A) above. Yield 200.3 g., M.P. 175–178° dec., $[\alpha]_D$=+111° (c, 1 in $CHCl_3$).

(B) PREPARATION OF 3β-ACETOXY-16-METHYL-5α-PREGN-16-ENE-11:20-DIONE

The 16:17-pyrazoline of 3β-acetoxy-5α-pregn-16-ene-11:20 dione (200 g.) was added to diethylene glycol (660 ml.) maintained at 187°±2° with stirring over 8 minutes. The solution which turned yellow and effervesced during the addition was held at this temperature for a further 10 minutes, cooled rapidly to ca. 90° and diluted carefully with water (1 litre). The suspension was allowed to cool to room temperature overnight and the crystals were collected on a sintered plate, washed thoroughly with water and dried at 100°/0.1 mm. for 4 hrs.

This crude product was dissolved in methanol (3.2 l.) and allowed to cool to 0° overnight. The crystals were collected by filtration, washed with ice-cold methanol (300 ml.) and dried at 60°/0.1 mm. for 3 hrs. Yield 116 g., M.P. 169–170°, $[\alpha]_D$=+25° (c, 1 in $CHCl_3$).

(C) 3β-ACETOXY-16α:17α-EPOXY-16β-METHYL-5α-PREGNANE-11:20-DIONE

5 N-sodium hydroxide solution (20 ml.) was added dropwise to a stirred mixture of 3β-acetoxy-16-methyl-5α-pregn-16-ene-11:20 dione (10 g.), methylene chloride (50 ml.), methanol (400 ml.), 100 volume hydrogen peroxide (30 ml.), water (100 ml.). The mixture was stirred at room temperature overnight. Addition of water (750 ml.), extraction with methylene chloride (4×200 ml.) washing the extract with water (4×800 ml.) and removal of the solvent in vacuo gave a crude product (9.2 g.). This was re-acetylated by heating with acetic anhydride (10 ml.) and pyridine (10 ml.) on the steam bath for 30 minutes. The mixture was diluted with water (50 ml.) filtered and solids washed with water (4×20 ml.) and dried at 100° C. in vacuo. The crude product (9.8 g.), M.P. 182–192° C. was recrystallised from industrial alcohol (50 ml.) to give the pure epoxide (7.1 g.) M.P. 192–196° C., $[\alpha]_D$ +74° (c, 1.075 in $CHCl_3$).

(D) REARRANGEMENT OF 3β-ACETOXY-16α,17α-EPOXY-16β-METHYL-5α-PREGNANE-11,20-DIONE

A 3.1% solution of hydrogen bromide in acetic acid (3.6 ml.) was added to a stirred solution of 3β-acetoxy-16α:17α - epoxy - 16β - methyl - 5α - pregnane - 11:20-dione (5 g.) in acetic acid (100 ml.). After stirring for 15 minutes at room temperature the mixture was decolorised by addition of anhydrous potassium acetate (0.1 g.) and water (150 ml.) was added. After a further 15 minutes stirring the solid product was collected by filtration, washed with water (4×50 ml.) and dried at 100° C. in vacuo. Yield, 3.92 g. (second crop 0.58 g. from the mother liquors). Recrystallisation from cyclohexane gave a product, M.P. 186–188.5° C., $[\alpha]_D$ −50.9° (c, 1.178 in $CHCl_3$) containing a substantial proportion of 16-methylene compound.

(E) HYDROGENATION WITH PALLADISED CHARCOAL IN TETRAHYDROFURAN

The material obtained according to (D) (2 g.) was shaken with hydrogen and pre-reduced 10% palladised charcoal (0.6 g.) in tetrahydrofuran (100 ml.). After 1½ hours hydrogenation was very slow (128 ml. taken up, ca. 1 mole) and the mixture was filtered and evaporated in vacuo. Crystallisation from petrol (B.P. 60–80°) gave a product (1.14 g.) $[\alpha]_D$ +7.1°. Part of this (0.5 g.) was re-hydrogenated by shaking with 50% by weight of 10% palladised charcoal in tetrahydrofuran (5 vols.). The final product crystallised from cyclohexane to give 0.29 g., M.P. 163–166° $[\alpha]_D$ +27.6° (c, 1.197 in $CHCl_3$).

*Example 15*

(a) To a solution of 3β-acetoxy-16β-methyl-16α:17α- oxido-5α-pregn-9(11)-en-20-one (20 g.) in tetrahydrofuran (400 ml.) was added 9 N-sulphuric acid (100 ml.). The resulting homogeneous solution was set aside at room temperature for 72 hours, during which time the α° reading of a sample, followed polarimetrically, decreased from +4.61° to −3.1°. Chloroform (600 ml.) and water (400 ml.) were added, the organic phase separated, washed with sodium bicarbonate solution, water and evaporated. The residue was acetylated at 95° for 15 min. with acetic anhydride (40 ml.) and pyridine (40 ml.). The excess of acetic anhydride was decomposed by the addition of a little water and the steroid precipitated by the further addition of water totalling 480 ml. The product was collected, washed with water and dried, (19.5 g.), $[α]_D$ −51.2° (CHCl$_3$). Infra-red examination suggested that it contained about 80% of the 16-methyl-15-en and 20% of the 16-methylene compound. The product was recrystallised twice from methanol to give pure 3-acetoxy-17α-hydroxy-16-methyl-5α-pregna-9(11):15-dien-20-one, M.P. 184–188°, $[α]_D^{20}$ −60° (CHCl$_3$).

The foregoing experiment was repeated with different solvent/acid combination and the results were as follows:

| Acid | Solvent | Product |
| --- | --- | --- |
| HCl | Tetrahydrofuran containing 18% Acetic Acid. | 16 methylene compound. |
| 11 N aqueous HBr | Tetrahydrofuran containing 10% Acetic Acid. | Essentially Δ$^{15}$ compound. |
| 11 N aqueous HCl | Tetrahydrofuran containing 5% Acetic Acid. | Essentially Δ$^{15}$ compound. |

(b) A solution of the same 16α:17α-oxide as in (a) (30 g.) in tetrahydrofuran (120 ml.) and acetic acid (6 ml.) was stirred at 19° and treated with concentrated (11 N) hydrochloric acid (12 ml.). After 1.5 hours the reaction mixture was poured into an excess of water containing a little sodium acetate and the product collected, washed with water, dried, and recrystallised twice from methanol affording the 16-methyl-15-ene compound (14.44 g., 48.1%) M.P. 184–189°, $[α]_D$ −60.2° C, 1.0 in CHCl$_3$), −46.4° (C, 1.0 in dioxan).

(c) 10% palladised charcoal (1.25 g.) in tertiary butanol (20 ml.) was pre-reduced in hydrogen and a solution of the 16-methyl-15-ene compound from (b) (2.5 g.) in tertiary butanol (100 ml.) and methylene chloride (25 ml.) added. The mixture was hydrogenated over 2 hours, the catalyst removed by filtration and the filtrate evaporated to dryness giving a crystalline residue (2.43 g.), $[α]_D$ +7.7° (dioxan). Recrystallisation from methanol afforded plates consisting essentially of the 16α-methyl compound, M.P. 173–176°, $[α]_D$ +6.8° (C, 1.0 in dioxan), −22° (C, 1.0 in CHCl$_3$).

*Example 16*

REARRANGEMENT OF 3β-ACETOXY-16α,17α-EPOXY-16β-METHYL-5α-PREGN-9(11)-EN-20-ONE WITH HYDROGEN BROMIDE IN TETRAHYDROFURAN-ACETIC ACID

The epoxide (600 mg.), in purified tetrahydrofuran (10 ml.), was treated with 2.2% hydrogen bromide in acetic acid (0.2 ml.). The rotation of the solution fell from $[α]_D$ +60° to $[α]_D$ −35° in 80 min., and then remained unchanged. After 2 hr. the solution was poured into water, and the precipitated product (560 mg.) $[α]_D$ −79.4° (CHCl$_3$) was collected by filtration, washed with water, dried, and recrystallised from ethyl acetate, to give the 16-methylene-compound (365 mg., 61%), M.P. 179–182°, $[α]_D$ −80.4° (c, 1.52 in CHCl$_3$).

*Example 17*

(A) PREPARATION OF 3β-ACETOXY-17α-HYDROXY-16-METHYL-5α-PREGNA-9(11),15-DIEN-20-ONE (i) 3β-acetoxy-16α,17α-epoxy-16β-methyl-5α-pregn-9(11)-en-20-one (1.0 g.) in methanol (20 ml.) and methylene chloride (11 ml.) was treated with hydrogen bromide in acetic acid (3.2 N; 1.0 ml.). The rotation fell from $α_D$ = +2.0 to $α_D$ = −1.25 in 22 hr., and remained steady for a further 2 hrs. The solution was then shaken with water (200 ml.) and methylene chloride (50 ml.), and the aqueous layer was extracted with more methylene chloride (3×10 ml.). The combined methylene chloride extracts were washed with aqueous sodium hydrogen carbonate and water and dried over magnesium sulphate. Removal of the solvent from the dried extract in vacuo left a residue (922 mg.), $[α]_D$ −59.5° (c, 0.86 in CHCl$_3$) which, from its infrared spectrum, contained ca. 40% of 3β-acetate.

The solid was heated at 100° for 30 min. in dry pyridine (10 ml.) and acetic anhydride (10 ml.), and the mixture was poured into ice-water (200 ml.). The precipitated product (952 mg.), M.P. 158–166°, $[α]_D$ −55° (c, 0.99 in CHCl$_3$) was collected by filtration. Crystallisation of part (800 mg.) from ethyl acetate gave needles (516 mg.) of 3β-acetoxy-17α-hydroxy-16-methyl-5α-pregna-9(11),15-dien-20-one, M.P. 179–182°, $[α]_D$ −63.5° (c, 0.93 in CHCl$_3$), containing some of the 16-methylene isomer.

(ii) 16α,17α-epoxy-3β-hydroxy-16β-methyl-5α-pregn-9(11)-en-20-one (5.0 g.) was treated as in the preceding experiment (i) to give, after acetylation, a crude product (5.824 g.), $[α]_D$ −33° (CHCl$_3$).

Crystallisation from ethyl acetate gave impure 16-methyl-Δ$^{15}$-compound in two crops, the first crop (3.30 g.) having M.P. 179–182°, $[α]_D$ −64.3° (c, 1.5 in CHCl$_3$), $[α]_D$ −43.5° (c, 2.0 in dioxan), and the second crop (573 mg.), M.P. 178–182°, $[α]_D$ −64.1° (c, 1.92 in CHCl$_3$). The mother liquor material was separated into hexane-insoluble (460 mg.) and hexane-soluble (1.2 g.) fractions. The insoluble fraction crystallised from methanol to give purer 16-methyl-Δ$^{15}$-compound (200 mg.), $[α]_D$ −60.6° (c, 1.56 in CHCl$_3$).

The impure 16-methyl-Δ$^{15}$-compound (3.0 g.) from the first crop, containing some of the 16-methylene isomer, in solution in pure dioxan (150 ml.) was treated with boron trifluoride etherate (3.0 ml.) at room temperature. During 75 min. the rotation of the solution changed steadily from $[α]_D$ −42.5° to $[α]_D$ −28°, and was continuing to rise. D-homoannulation of the 16-methylene compound is complete under these conditions. The solution was then poured into ice-water, (1200 ml.), and after 2 hrs. the precipitated product (2.91 g.), $[α]_D$ −42° (CHCl$_3$) was collected by filtration, washed with water, and dried. One crystallisation from hexane (1000 ml. conc. to 400 ml.) gave the 16-methyl-Δ$^{15}$-compound as needles (1.98 g.), M.P. 182–184° $[α]_D$ −63° (c, 1.24 in CHCl$_3$). Further crystallisations from hexane, then from methanol gave the analytical sample (1.10 g.), M.P. 183.5–185°, $[α]_D$ −61.4° (c, 1.22 in CHCl$_3$) (found: C, 75.0; H, 9.0; $C_{24}H_{34}O_4$ requires C, 74.6; H, 8.9%).

(B) HYDROGENATION OF 3β-ACETOXY-17α-HYDROXY-16-METHYL-5α-PREGNA-9(11),15-DIEN-20-ONE

3β-acetoxy-17α-hydroxy-16-methyl-5α-pregna-9(11),15-dien-20-one (152 mg.) in ethyl acetate (15 ml.) was reduced over a 5% palladium-on-charcoal catalyst (56 mg.). The hydrogenation ceased after the uptake of only 0.8 mol. of hydrogen in 3 hours. The product, worked up in the usual way, had $[α]_D$ +10° (c, 1.12 in dioxan). Three crystallisations from petroleum ether gave a mixture (46 mg.) of 16α- and 16β-methyl isomers, M.P. 171–174°, $[α]_D$ +7.5° (c, 2.36 in dioxan) containing 80–90% of the former.

The crude acetate (260 mg.) from a similar experiment was boiled under reflux for 3 hours with potassium bicarbonate (155 mg.) in methanol (8 ml.) and water (3 ml.). The 3,17-diol (168 mg.), $[α]_D$ +8.5° (c, 1.1 in dioxan), which separated was filtered from the hot solution, washed with hot aqueous methanol and dried at 100°/0.5 mm. Four crystallisations from aqueous methanol gave a pure sample of 3β,17α-dihydroxy-16α- methyl-5α-pregn-9(11)-en-20-one (68 mg.), M.P. 233–237°, [α]_D +2.8° (c, 0.6 in dioxan).

The recrystallised diol (50 mg.) was acetylated with acetic anhydride and pyridine at 100° for 15 min., and the crude product was crystallised from petroleum (B.P. 60–80°) to give 3β-acetoxy-17α-hydroxy-16α-methyl-5α-pregn-9(11)-en-20-one (46 mg.), M.P. 175–177°, [α]_D +3° (c, 2.0 in dioxan).

*Example 18*

PREPARATION OF PURE 3β-ACETOXY-17α-HYDROXY-16α-METHYL-5α-PREG-9(11)-EN-20-ONE BY PARTIAL D-HOMO-ANNULATION OF MIXTURES OF 16α- AND 16β - METHYL - 3β - ACETOXY - 17α - HYDROXY - 5α-PREGN-9(11)-EN-20-ONE

A mixture of 16α- and 16β-methyl-3β-acetoxy-17α-hydroxy-5α-pregn-9(11)-en-20-one (265 mg.) (ca. 1:1) in dioxan (10 ml.) was treated with boron trifluoride etherate (0.2 ml.) and stored at room temperature. After 15 min., when the rotation was constant at +4.9°, the mixture was diluted with water, extracted with ether, washed with dilute sodium bicarbonate solution and water, and evaporated in vacuo to dryness, to give a mixture of crystals and oil (270 mg.). Two crystallisations from petroleum-ether gave 3β-acetoxy-17α-hydroxy-16α-methyl-5 -pren-9(11)-en-20-one (50 mg.) as needles, M.P. 177–180° after previous sweating, [α]_D +4.1 (c, 2.21 in dioxan).

*Example 19*

3β,17α-DIHYDROXY-16α-METHYL-5α-PREGN-9(11)-EN-20-ONE

3β-acetoxy-17α-hydroxy-16-methylene-5α-pregn-9(11)-en-20-one (5.0) in ethyl acetate (50 ml.) was added to a pre-reduced suspension of 5% palladium-on-charcoal (1.66 g.) in ethyl acetate (200 ml.). One mol. of hydrogen was taken up in 9 min. and uptake had virtually ceased at 1.13 mol. after 30 min. The product, isolated in the usual way, had [α]_D +16.5° (c, 1.57 in dioxan. The infrared spectrum and optical rotation indicated the presence of ca. 60–70% of the 16α-isomer.

The hydrogenation product (1.0 g.), in methanol (30 ml.), was refluxed for 3 hours with a solution of potassium bicarbonate (600 mg.) in water (12 ml.). The reaction mixture was filtered hot, furnishing white cubic crystals (583 mg., 65%), M.P. 215–230°, [α]_D+1.3° (c, 1.58 in dioxan). Crystallisation from aqueous methanol gave 3β,17α-dihydroxy-16α-methyl-5α-pregn-9(11)-en-20-one (351 mg. 40%), M.P. 225–235°, [α]_D+1° (c, 11.10 in dioxan).

The filtrate from the above hydrolysis was allowed to cool, yielding needles (190 mg.), M.P. 201–0, [α]_D +29° (c, 1.3 in dioxan), which were identified as consisting predominantly (ca. 75%) of 3β,17α-dihydroxy-16β-methyl-5α-pregn-9(11)-en-20-one.

A portion (202 mg.) of 3β,17α-dihydroxy-16α-methyl-5α-pregn-9(11)-en-20-one, prepared as above, was acetylated with acetic anhydride in pyridine for 6 hours at room temp. The reaction mixture was worked up in the usual way and crystallised from petroleum ether to give a slightly impure sample of 3β-acetoxy-17α-hydroxy-16α-methyl-5α-pregn-9(11)-en-20-one (192 mg., 87%), M.P. 160–165°, [α]_D +1° (c, 2.2 in dioxan.)

We claim:

1. A process for the preparation of a product which is a 17α-hydroxy-16-methyl-20-keto-steroid of the 5α-series in which the 16α-methyl isomer predominates, which process comprises contacting a 16:17-epoxy-16β-methyl-20-keto steroid of the 5α-series with an acid catalyst in an ionising solvent medium to rearrange said last-mentioned compound to produce a mixture of 16-methylene- and Δ$^{15}$-compounds in which the Δ$^{15}$-compound is in excess, contacting said mixture with boron trifluoride to effect D-homo-annulation of the 16-methylene compound without changing said Δ$^{15}$-compound, separating the Δ$^{15}$-compound from the resultant mixture, and hydrogenating the separated Δ$^{15}$-compound in the presence of a palladium hydrogenation catalyst.

2. A process for the preparation of a product which is a 17α-hydroxy-16-methyl-Δ$^{9(11)}$-20-keto steroid of the 5α-series in which the 16α-methyl isomer predominates, which process comprises contacting a 16:17-epoxy-16β-methyl-Δ$^{9(11)}$-20-keto steroid of the 5α-series with an acid catalyst in an ionising solvent medium to rearrange said last-mentioned compound to produce a mixture of 16-methylene and Δ$^{15}$-compounds in which the Δ$^{15}$-compound is in excess and hydrogenating said mixture in the presence of an organic base and a palladium hydrogenation catalyst.

3. A process as claimed in claim 2 in which said organic base is triethylamine.

References Cited in the file of this patent
UNITED STATES PATENTS

| | | |
|---|---|---|
| 2,947,765 | Julian et al. | Aug. 2, 1960 |
| 2,954,386 | Beyler | Sept. 27, 1960 |
| 2,960,503 | Weinstock et al. | Nov. 15, 1960 |
| 2,963,495 | Fried et al. | Dec. 6, 1960 |

OTHER REFERENCES

Nomine et al.: Tetrahedron, vol. 8, 217–220 (1960).